United States Patent Office 3,194,824
Patented July 13, 1965

3,194,824
PREPARATION OF CYCLOPENTADIENYL
GROUP VB METAL TETRACARBONYLS
Robert P. M. Werner, Binningen, Basel-Land, Switzerland, and Switlana Manastyrskyj, Warren, Mich., assignors to Ethyl Corporation, New York, N.Y., a corporation of Virginia
No Drawing. Filed Dec. 11, 1961, Ser. No. 158,565
10 Claims. (Cl. 260—429)

This invention relates to novel organometallic compounds and to a new process for forming them. More particularly, the invention relates to a novel process for forming certain cyclopentadienyl carbonyl derivatives of Group VB metals.

An object of this invention is to provide a novel process for preparing new organometallic compounds. Another object is to provide new organometallic compounds. A further object is to provide a process for producing stable cyclopentadienyl tetracarbonyl compounds of tantalum and niobium. Still another object of this invention is to provide an improved method for plating tantalum and niobium. Another object is to provide an economical method for plating tantalum and niobium on a variety of substrates. Additional objects of this invention will be apparent from the following discussion and the appended claims.

The objects of this invention are accomplished by providing a process for the formation of organometallic complexes having the formula $QM(CO)_4$, where M is an atom of a metal of Group VB of the Periodic Table of atomic number of at least 41, Q is selected from the class consisting of the cyclopentadienyl radical and hydrocarbon substituted cyclopentadienyl radicals having 6 to 13 carbon atoms, said process comprising reacting (A) a compound having the formula $M_1E_xM(CO)_6$, where $M_1$ is selected from the class consisting of alkali and alkaline earth metal atoms, E is selected from the class consisting of bidentate and tridentate ethers, $x$ is an integer having the value of three when E is a bidentate ether and two when E is a tridentate ether and M is a Group VB metal atom of atomic number of at least 41, with (B) an alkali metal-cyclopentadienyl complex or an alkaline earth cyclopentadienyl complex wherein the cyclopentadienyl moiety is selected from the class consisting of the cyclopentadienyl radical and hydrocarbon substituted cyclopentadienyl radicals having 6 to 13 carbon atoms, said process being carried out in the presence of an oxidizing agent and at a temperature of about 25° to about 100° C.

Additional objects of this invention are accomplished by providing a process in which an oxidizing agent, usually a halide of a Group IIB metal, is reacted with an alkali or alkaline earth metal etherate salt of a niobium or tantalum metal hexacarbonyl anion and an alkali or alkaline earth metal cyclopentadienyl complex in the presence of an ether solvent. For example

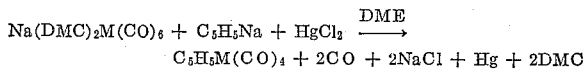

$C_5H_5M(CO)_4 + 2CO + 2NaCl + Hg + 2DMC$

M=Niobium and tantalum
DMC=Dimethylcarbitol (diethyleneglycol dimethylether)
DME=Dimethoxyethane Fischer et al.'s method, Z. Naturforschg., 9B 503 (1954) which yields cyclopentadienyl vanadium tricarbonyl, uses vanadium tetrachloride as the starting material. The novel process described and claimed herein uses vanadium trichloride as the source of vanadium. The new process described herein is decidedly more simple than Fischer et al.'s method. Fischer et al.'s method entails six specific steps. The first step is the preparation of a cyclopentadienyl Grignard reagent. This Grignard reagent is then reacted with vanadium trichloride to yield a mixture of bis(cyclopentadienyl) magnesium and bis-(cyclopentadienyl) vanadium. These two products are then removed by sublimation. After the sublimation the mixture of the two products, bis(cyclopentadienyl) magnesium and bis(cyclopentadienyl) vanadium, is carboxylated in an ether solution using carbon dioxide as the carboxylating agent. After as econd sublimation, bis(cyclopentadienyl) vanadium is obtained. Then, the bis(cyclopentadienyl) vanadium is carbonylated, using carbon monoxide, to obtain cyclopentadienyl vanadium tetracarbonyl.

The total novel process of this invention, including the steps described in a copending application of Werner and Podall cited below, involves the reductive carbonylation of a niobium or tantalum pentahalide in the presence of a Group IA–IIA metal and diethyleneglycol dimethylether with carbon monoxide to yield a Group IA–IIA metal etherate compound described in the previous publication, Chem. and Ind. 144 (1961). This Group IA–IIA metal etherate salt is then reacted with a Group IA or Group IIA derivative of the cyclopentadiene hydrocarbon, in the presence of an oxidizing agent, to yield the desired compound in an impure state. The desired product is then purified by sublimation.

N. P. Sidgwick, in his work "Chemical Elements and Their Compounds," states on page 804 that "as is usual in the (B) subgroup, the difference between the first (V) and the second (Nb) member is much greater than that between the second (Nb) and the third (Ta) . . ." Sidgwick also enumerates many of the other differences in the chemistry of the Group VB transition metal series.

The process of preparing the compounds of this invention involves the use of an oxidizing agent. Since the formal oxidation state of the transition metals in the etherate sodium hexacarbonyl metalates of niobium and tantalum is −1, an oxidizing agent is used to facilitate formation of the tetracarbonyl cyclopentadienyl complexes wherein the Group VB metal is in the +1 oxidation state. The oxidizing agent can be selected from a wide variety of oxidants known in the art. For example, it can be a metal salt, especially a salt of a Group IB or IIB metal such as a metal halide or metal oxyhalide, or a complex metal salt such as that present in Tollen's reagent. Such salts as silver thiocyanate, silver cyanate, copper chloride, and copper bromide and the like can be employed as the oxidant. Many other oxidizing techniques, such as electrolytic oxidation, oxidation with air, oxygen or ozone, can also be employed. The common oxidizing agents, potassium dichromate, potassium permanganate and the like can also be employed. However, they are not preferred since reactions conducted in their presence are not easily controlled and undesirable side reactions occur.

The oxidizing agent is preferably selected from those metal halides which are both readily reduced and do not form cyclopentadienyl compounds of exceeding stability. The metal halides which are preferably employed as oxidants in our process are the Group IIB dihalides. More preferably, the oxidant is a mercury dihalide. Mixtures of the above metal halides may be employed in our process. As an example, we can employ a mixture of mercury and zinc dihalides as the oxidant.

The halogen anions present in the metal salts used as oxidants in our process are fluorine, chlorine, bromine, and iodine. In addition, salts containing pseudohalogenic anions may also be employed. For example, $CN^-$, $CNS^-$, $CNO^-$ salts of the above described metals can be utilized. Hypohalite anions such as $OCl^-$, $OBr^-$, and $OI^-$ may also be present in the salts employed. Preferably, the anion present in the salt used as an oxidant is a halogen, and most preferably, it is chlorine. Hence, the most preferred metal halide used in our process is $HgCl_2$.

The molar ratio of the Group IIB metal halide and the active metal cyclopentadienyl complex and the etherate sodium hexacarbonyl niobates and tantalates employed in the process of this invention is not critical. However, we prefer to use an approximately equivalent mixture of the Group IIB metal halides and the Group IA-IIA metal cyclopentadienyl complex, because good yields are obtained without excessive wasting of a reactant. A preferred molar ratio range is from about 1.2:1.2:1.0 to about 1.5:1.5:1.0 (metal halide:cyclopentadienyl-active metal complex:etherate sodium hexacarbonyl metallates).

The ether solvent may be a cyclic or straight-chain ether and can contain one or a plurality of ether linkages. Typical ethers which are representative of those we employ in our process are diethylether, dibutylether, dioxane, diethyleneglycol dimethylether, ethyleneglycol diethylether, diethyleneglycol diethylether, and ethyleneglycol dimethylether (dimethoxyethane, DME).

The preferred solvent is dimethoxyethane This ether is a satisfactory solvent for all three reactants. Dimethoxyethane is also preferred because it has a relatively low boiling point This greatly facilitates removal of the solvent after the reaction has been completed This solvent is relatively non-toxic Therefore, it can be used in large quantities without elaborate safety precautions All solvents are preferably carefully de-aerated and purified prior to use.

The essential portions of the alkali and alkaline earth metal etherate salts of niobium and tantalum hexacarbonyl used as starting compounds in our process are the anions $Nb(CO)_6^-$ and $Ta(CO)_6^-$. The other portions of the molecule, namely the alkali or alkaline earth metal and the ether do not touch the heart of the process. Hence, any and all the compounds prepared by the process disclosed in the copending application, Serial No. 80,542, "Organometallic Compounds," R.P.M. Werner and H. E. Podall, filed January 4, 1961, can be used in this process. An illustrative but not limiting list of these compounds is sodium bis(diethyleneglycol dimethylether) hexacarbonyl niobate (−1), sodium bis(diethyleneglycol dimethylether) hexacarbonyl tantalate (−1). Though similar derivatives of bidentate and monodenate ethers can be utilized, we prefer to use the tridentate ether derivatives illustrated above because they are the most stable alkali and alkaline earth metal-etherate salts of Group VB hexacarbonyls. We can utilize mixtures such as a mixture of the sodium and potassium salts of the hexacarbonyl niobates and tantalates. Because of their greater ease of preparability, we prefer to use the alkali metal-etherate Group VB metal hexacarbonyls. Since sodium and potassium are the most economical of these metals their complexes are the most preferred.

The alkali metal or alkaline earth metal cyclopentadienyl compound used as a reactant in this process contains a cyclomatic radical, that is, a radical containing the cyclopentadienyl moiety. In general, such cyclomatic hydrocarbon groups can be represented by the formulae:

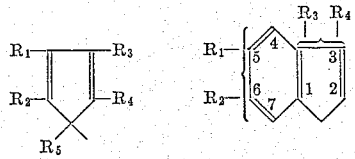

where each R is selected from the group consisting of hydrogen and univalent hydrocarbon radicals.

A preferred class of cyclomatic radicals suitable in the process of this invention are those which contain from 5 to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4-tert-butyl indenyl and the like. These radicals are preferred as they are the most readily available cyclomatic radicals and the Group VB cyclomatic coordination compounds obtainable from them have desirable characteristics which render them of superior utility.

The alkali metal atom which is present in the alkali metal cyclopentadienyl complex can be lithium, sodium, potassium, cesium or rubidium. We prefer to use the sodium and potassium derivatives because of the commercial availability of these two metals. Hence, compounds such as cyclopentadienyl sodium and ethylcyclopentadienyl potassium and the like are preferred. The alkali metal-cyclopentadienyl compounds are preferred since they are more reactive than the alkaline earth metal-cyclopentadienides such as magnesium dicyclopentadienide, calcium dicyclopentadienides, barium dicyclopentadienides and strontium dicyclopentadienides. The preferred alkaline earth derivatives are magnesium dicyclopentadienides.

The process may be carried out over a temperature range from about 0° C. to about 150° C. Temperatures higher than 150° C. tend to increase the amount of decomposition occurring in the reaction and temperatures lower than about 0° C. tend to increase the reaction time beyond a practical limit. Preferably, the process is carried out at a temperature of about 25° C. to about 100° C. since at these temperatures yields are maximized while the undesired side reactions are minimized and the reaction time is not unduly prolonged. Generally, the process is carried out with agitation of the reaction mixture since this insures a more even reaction rate.

The process proceeds smoothly at atmospheric pressure. However, pressures as low as 0.1 of an atmosphere and as high as 150 atmospheres can be utilized. We prefer to use a pressure range of 0.5 to 1.8 atmospheres.

The time required for our process is not a truly independent variable, but is dependent to some degree upon the other process conditions employed. Thus, for example, if a relatively high temperature and a relatively high pressure, rapid agitation, and a fast rate of addition of one reactant to the reaction mixture are employed, the reaction time will be reduced. If, on the other hand, a relatively low temperature, a relatively low pressure, slight agitation and a slow addition of a reactant to the reaction mixture are used, the reaction time will be proportionately increased. In practice, the necessary reaction time is easily determined since the course of the reaction can be traced by observing the amount of carbon monoxide produced by the reaction, either volumetrically or manometrically. During the course of the reaction an increment in pressure or volume occurs. When the pressure or volume ceases to rise, this is evidence that the reaction is completed. In general, from about one to about 40 hours is sufficient, although, as stated above, other reaction times can be employed if the process conditions are varied accordingly. We prefer to use those reaction conditions that enable the reaction to be complete in about 1 to about 10 hours.

Our process is preferably carried out under a protective atmosphere. For this purpose we employ a blanket of an inert gas such as nitrogen, helium, argon, krypton or the like in the reaction system. Because of its commercial availability, we prefer to use nitrogen gas for this purpose. Such gases can also be employed to increase the pressure in the reaction vessel if this is desired.

The products formed from our process are readily separated from the reaction mixture. A classical technique such as recrystallization or chromatography can be used. However, we prefer to use the following separation procedures.

The reaction mixture is first filtered under nitrogen to remove the insoluble products produced by the reaction. Then the solvent is removed by distillation, usually under reduced pressure, preferably using a rotary evaporator. The residual solids are then purified by sublimation. Removal of a trace of co-sublimed solid is effected by extraction of the crude sublimate with ether, followed by filtration and resublimation. Here again, instead of subliming the product, it can be either recrystallized from a suitable solvent or isolated by a chromatographic technique.

We have modified our separation procedure and are able to obviate the second sublimation by the following technique. After the reaction mixture is filtered under nitrogen and the solvent is removed, using reduced pressure and reduced temperature, the residual solids obtained by filtration under nitrogen are washed several times with water. Then, the precipitate is extracted with ether and the ether solution filtered under nitrogen. The ether is removed by distillation using a rotary evaporator. The solid crude product is then sublimed and then washed with ether. The product is then dried to obtain the pure product.

The following examples illustrate the use of our novel process for the preparation of the cyclomatic tetracarbonyl complexes of the Group VB metals. All parts and percentages are by weight unless otherwise indicated.

EXAMPLE I

*Preparation of cyclopentadienyl tantalum tetracarbonyl*

A solution of 1.65 parts of cyclopentadienyl sodium in 100 parts of dimethoxyethane was poured into a suitable reaction vessel (previously swept with nitrogen) equipped with heating, stirring and condensing means, a gas trap, and liquid inlet means. While stirring the solution, 5.1 parts of $HgCl_2$ dissolved in 50 parts of dimethoxyethane was added to the vessel. While stirring and maintaining the mixture under nitrogen at 25° C., 8 parts of tris(dimethoxyethane) sodium hexacarbonyl tantalum (−1) was slowly added to the mixture. The addition was complete after two hours. The reaction mixture was filtered under nitrogen. The solvent was then removed using a rotary evaporator and the residual solids were extracted with water. The mixture was filtered under nitrogen and the precipitate washed several times with water. The precipitate was then extracted with ether and the ether solution filtered under nitrogen, yielding a clear orange solution. Evaporation of the ether and subsequent sublimation at 105° C. and 0.1 mm. Hg, afforded large red crystals. They were washed with a few milliliters of cold petroleum ether and dried. The ruby red crystals were stable in air for several days. They melted under nitrogen at 171–173° C. The compound was soluble in most organic solvents, such as ether, petroleum ether, benzene, and carbon disulfide, and its solutions were unstable in air. In carbon disulfide, its infrared spectra exhibited bands at 1900 and 2020 cm.$^{-1}$. The compound cyclopentadienyl tantalum tetracarbonyl, as shown by magnetic susceptibility measurements, is diamagnetic. *Analysis.*—Calculated for $C_9H_5O_4Ta$: C, 30.19; H, 1.41; Ta, 50.52. Found: C, 29.9; H, 1.48; Ta, 50.56.

Similarly, methylcyclopentadienyl sodium, 2-ethyl-3-propylcyclopentadienyl sodium and 2-methylindenyl sodium yield the corresponding tantalum complexes, methylcyclopentadienyl tantalum tetracarbonyl, 2-ethyl-3-propylcyclopentadienyl tantalum tetracarbonyl and 2-methylindenyl tantalum tetracarbonyl.

EXAMPLE II

*Preparation of cyclopentadienyl tantalum tetracarbonyl*

A suitable reaction vessel equipped with heating, stirring and condensing means, a gas trap and liquid inlet means was swept with nitrogen. A mixture of 2 parts of cyclopentadienyl sodium and 6.2 parts of mercuric chloride dissolved in 60 parts of dimethoxyethane was introduced into the vessel. Stirring was commenced, and while the mixture was kept under nitrogen, an unfiltered mixture of 12 parts of bis(diethyleneglycol dimethylether) sodium hexacarbonyl tantalum (−1) was added slowly via the liquid inlet means. The addition was complete after two hours. At that time the reaction mixture was filtered and then placed in a suitable rotary evaporator. The solvent was then removed under reduced pressure. The residual solids were sublimed to yield a crude product. The product was then dissolved in ether and filtered. The ether was removed under reduced pressure. The residual solids were resublimed and the pure product, cyclopentadienyl tantalum tetracarbonyl, was isolated. The yield was 68.8 percent.

EXAMPLE III

*Preparation of cyclopentadienyl tantalum tetracarbonyl*

The procedure of Example I is repeated except the analogous calcium etherate salt of tantalum hexacarbonyl is used in place of the sodium etherate salt. A good yield of cyclopentadienyl tantalum tetracarbonyl is prepared.

EXAMPLE IV

*Preparation of cyclopentadienyl tantalum tetracarbonyl*

The procedure of Example I is repeated except that magnesium dicyclopentadienide is used instead of cyclopentadienyl sodium. A good yield of cyclopentadienyl tantalum tetracarbonyl is prepared.

EXAMPLE V

*Preparation of cyclopentadienyl niobium tetracarbonyl*

A solution of 1.7 parts of cyclopentadienyl sodium in 100 parts of dimethoxyethane was poured into a suitable reaction vessel (previously swept with nitrogen) equipped with heating, stirring and condensing means, a gas trap, and liquid inlet means. While stirring the solution, 5.5 parts of $HgCl_2$ dissolved in 50 parts of dimethoxyethane was added to the vessel. While stirring and maintaining the mixture under nitrogen at 25° C., 9.0 parts of bis(diethyleneglycol dimethylether) sodium hexacarbonyl niobium (−1) was slowly added to the mixture. The addition was complete after two hours. The reaction mixture was filtered under nitrogen. The solvent was then removed using a rotary evaporator and the residual solids were extracted with water. The mixture was filtered under nitrogen and the precipitate washed several times with water. The precipitate was then extracted with ether and the ether solution filtered under nitrogen. The ether was removed by distillation using a rotary evaporator. The crude solid product was sublimed; no further re-sublimation was required. The yield of ruby red cyclopentadienyl niobium tetracarbonyl, M.P. 144–146° C. was 41 percent. The product was soluble in organic solvents such as ether, ligroin, benzene and carbon disulfide. Calculated for $C_9H_5NbO_4$: C, 40.03; H, 1.87; Nb, 34.40. Found: C, 39.83; H, 2.09; Nb, 33.7. Qualitative infrared analysis of a $CS_2$ solution of the product demonstrated the presence of carbonyl groups since two strong maxima occurred at 1901 and 2000 cm.$^{-1}$.

Similarly, when the compounds 2,3-dimethylcyclopentadienyl sodium and 6,7-dimethylindenyl sodium are used in place of cyclopentadienyl sodium, the products are 2,3-dimethylcyclopentadienyl niobium tetracarbonyl and 6,7-dimethylindenyl niobium tetracarbonyl.

EXAMPLE VI

*Preparation of cyclopentadienyl niobium tetracarbonyl*

The procedure of Example V is repeated except the analogous magnesium etherate salt of niobium hexacarbonyl is used in place of the sodium etherate salt of niobium hexacarbonyl. A good yield of cyclopentadienyl niobium tetracarbonyl is prepared.

EXAMPLE VII

*Preparation of cyclopentadienyl niobium tetracarbonyl*

The procedure of Example V is repeated except that barium dicyclopentadienide is used in place of the cyclopentadienyl sodium. A good yield of cyclopentadienyl niobium tetracarbonyl is prepared.

Our compounds are not only useful intermediates but are valuable metal plating compounds. In order to effect metal plating, our novel compounds are decomposed in an evacuated space containing the object to be plated. On decomposition they lay down a film on the metal target to be plated. The gaseous plating technique may be carried out in the presence of an inert gas so as to prevent oxidation of the metal surface to be plated. The following example illustrates the metal plating process.

EXAMPLE VIII

*Vapor phase plating of a steel with cyclopentadienyl tantalum tetracarbonyl*

A suitable quantity of cyclopentadienyl tantalum tetracarbonyl was placed into a reservoir equipped with heating means. The reservoir was connected through a valve, to a plating chamber wherein the object to be plated, a steel plate, was supported. The steel plate was connected to a temperature measuring device. The plating chamber was equipped with an induction coil which surrounded the metal object to be plated. The plating chamber was connected to a cold trap downstream from the reservoir and the cold trap was connected to a vacuum pump. The system was evacuated to a pressure less than 0.2 mm. of mercury. The reservoir was sufficiently heated to volatilize the cyclopentadienyl tantalum tetracarbonyl and to provide a steady continuous evolution of that compound. The temperature of the steel plate was raised to 400–550° C.

Upon contact of the vapor with the hot steel plate, a metallic tantalum-containing deposit was deposited on the plate. The organic vapors resulting from the decomposition of the plating compound together with the unused plating compound were collected in the cold trap. The unused material was recovered by suitable extraction and crystallization and used in another run.

Any material which can withstand a temperature of 400° C. can be plated with a tantalum or niobium containing deposit using this technique. Iron, copper, bronze, brass, chromium, and various porcelains and other ceramics can be coated.

As mentioned previously, an object of this invention is to provide an improved method for plating tantalum and niobium on a diversity of substrates. A further object is to provide a more efficient and effective method for plating tantalum in an economical manner.

The above and other objects are accomplished by a process for plating a Group VB metal upon a substrate which comprises thermally decomposing a vapor consisting essentially of the cyclopentadienyl tetracarbonyl of niobium and tantalum in contact with said substrate wherein said process is conduced at a temperature of from about 200° C. to about 600° C., and at a pressure of from about 0.01 mm. to about 10 mm. of mercury. The objects set out hereinabove are further accomplished by a process for plating tantalum or niobium on a substrate which comprises heating said substrate to a temperature of between about 200° C. to about 500° C. and contacting a vapor consisting essentially of one of the compounds prepared by the process of this invention with said substrate wherein said contacting is carried out at a pressure of between about 0.01 mm. to about 10 mm. of mercury.

The deposition chamber pressure may range from about 0.001 mm. of mercury to about 30 mm. of mercury. The preferred pressure in the deposition chamber is from about 0.01 to about 10 mm. of mercury since better plates are obtained within this pressure range and transportation of the plating vapor is facilitated. The most preferred pressure range is from about 0.01 to about .05 mm. of mercury since better results are obtained within this range.

The temperature conditions coupled with pressure in the plating chamber forms the critical feature of the present process. Thus, where the temperature ranges from about 200° C. to about 600° C. preferably 400° C. to 550° C., and the pressure in the chamber ranges from about 0.01 to about 10 mm. of mercury, better plates are obtained having better adherence to the substrate and pinhole free surfaces.

In the process of this invention a carrier gas is not required or desirable. Generally carrier gases tend to react with the chromium being plated to form carbides, nitrides or other products as the metal is deposited upon the substrate. Furthermore, carrier gases usually contain small amounts of impurities which ultimately effect the plating process. Hence, a carrier gas is not generally used in the process of this invention and is preferably avoided. However, under some circumstances, because of the more improved plates obtained by the unique combination of temperature and pressure conditions of this invention, carrier gases such as hydrogen, carbon dioxide, nitrogen and argon may be tolerated and used to facilitate the flow of the vaporized plating compound.

In initially vaporizing the plating compound prior to its use in the actual plating operation, temperatures from about 100° C. to about 200° C. may be used. It is preferred, however, to vaporize the cyclopentadienyl tantalum or niobium tetracarbonyl compound at temperatures from about 150° C. to about 200° C. The temperature used depends on the flow rate desired.

The flow rate of the niobium or tantalum tetracarbonyl vapor is dependent to a certain extent upon the amount of pressure in the plating chamber and the temperature to which the chromium hexacarbonyl is subjected. Ordinarily, the flow rates of the plating compound employed vary from about 1 foot per minute to about 30 feet per second although faster or slower rates can be employed.

The time required to plate the tantalum or niobium by the process of this invention varies over a wide range, depending on flow rate, desired coating thickness, deposition chamber pressure, temperature of the substrate and the vaporization temperature of the plating compound. However, times from about 15 minutes to about 10 hours are generally acceptable. For economic reasons, it is preferred, however, that the process time range from about 30 minutes to about 3 hours, depending on the desired thickness of the chromium coating.

Well adherent niobium and tantalum metal coatings can be obtained through depositing its vapor directly upon any substrate that can withstand the plating conditions. Typical examples of substrates which may be plated are nickel, Pyrex glass, beryllium, molybdenum, graphite, ceramics, high temperature resistant plastics, and the like. The preferred substrates which can be plated are ferrous metal substrates, aluminum and the like.

In some cases, the substrate to be plated is preferably subjected to initial preparation. This is especially true in the case of metal substrates. In other words, the degree of adherence achieved through the unique vapor plating process of this invention, in some instances where desirable, can be further improved by an appropriate metal surface pre-treatment. The best metal surface preparation is achieved through degreasing with a solvent such as 1,1,2-trichloroethylene or the like followed by light sand blasting. The vapor plated coatings have even better adherence on slightly uneven surfaces, such as created by sandblasting, than on highly polished substrates. Thus, not desiring to be bound by theoretical considerations, it is felt that sandblasting permits a better anchoring effect of the deposited metal which penetrates into the small pits of the surface. On substrates such as graphite and ceramics where the surface is already nonuniform, if desired, degreasing can be performed to assure a clean plating surface. Other substrate pre-treatments known to the art can be employed, if desired, and will now be evident for the above and other substrates.

The types of apparatus which may be used for the plating operation are any of the apparatus described in the prior art, such as set forth by Lander and Germer in "Plating Molydenum, Tungsten and Chromium by Thermal Deposition of Their Carbonyls," or by Powell, Campbell and Gonser in the book "Vapor Plating," John Wiley and Sons, New York, 1955, wherein a vacuum chamber is used.

Heating may be achieved by numerous methods. Generally, resistance heating, infrared heating or induction heating are used according to the nature of the substrate and the type of equipment which is employed since the equipment largely determines the heat requirements. Flat samples such as metal plates can generally be heated by resistance heating apparatus such as a hot plate. For uneven shaped objects, induction heating or infrared heating may be used, depending on the nature of the substrate.

For the plating operation of this invention, the object to be plated is heated to a temperature of 250 to 550° C. preferably 300 to 450° C. in an enclosed chamber. The system is evacuated and the plating agent is heated to an appropriate temperature wherein it possesses vapor pressure of preferably up to about 5 mm. of mercury. In most instances, the process is conducted at no lower than 0.01 mm. mercury pressure. The vapors of the plating agent are pulled through the system as the vacuum pump operates, and they impinge on the heated object, decomposing and forming the metallic coating.

In addition to the thermal decomposition techniques discussed hereinabove for decomposing the plating agents of this invention, other methods for decomposition can be employed. Such methods are decomposition of a niobium or tantalum compound by ultrasonic frequency or by ultraviolet irradiation. The former process involves essentially the same procedure as employed in Example VIII with the exception that an ultrasonic generator is proximately positioned to the plating apparatus. The niobium or tantalum compound is then heated to its decomposition threshold and thereafter the ultrasonic generator is utilized to effect final decomposition. Decomposition by ultraviolet irradiation involves essentially the same method as utilized in Example VIII with the exception that in place of the resistance furnace there is utilized for heating a battery of ultraviolet and infrared lamps placed circumferentially around the outside of the heating chamber. The substrate to be heated is brought to a temperature just below the decomposition temperature of the niobium or tantalum plating agent with the infrared heating and thereafter decomposition is effected with ultraviolet rays.

Although the above techniques generally employ the niobium or tantalum plating agent in its vapor phase, other techniques besides vapor phase plating can be employed. For example, the substrate to be plated can be placed in a decomposition chamber and the plating agent packed in contact with the element and thereafter heated to a temperature above the decomposition temperature of the plating agent. The volatile by-products of the decomposition reaction escape leaving an adherent deposit on the substrate.

Deposition of metal on a glass cloth illustrates the latter process. A glass cloth band weighing one gram is dried for one hour in an oven at 150° C. It is then placed in a tube which is devoid of air and there is added to the tube 0.5 gram of cyclopentadienyl tantalum tetracarbonyl. The tube is heated at 400° C. for one hour after which time the tube is cooled and opened. The cloth has a uniform metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection, and as a heating element.

These new compounds of this invention are useful antiknocks when added to a petroleum hydrocarbon. Further, they may be used as supplemental antiknocks, that is, in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as an antiknock, these compounds may be present in the gasoline in combination with typical halogen scavengers such as ethylene dichloride, ethylene dibromide, and the like.

The novel compounds of this invention are particularly useful as chemical intermediates, fuel and lubricating oil additives, polymerization catalysts, combustion control additives, fungicides, herbicides, pesticides, and bactericides.

Having fully described the novel compounds of our invention, their utilities and the methods used in preparing the compounds, it is desired that this invention be limited only within the scope of the appended claims.

We claim:

1. Process for the formation of organometallic complexes having the formula $$QM(CO)_4$$

where M is an atom of a metal of Group VB of the Periodic Table of atomic number of at least 41, Q is selected from the class consisting of the cyclopentadienyl radical and hydrocarbon substituted cyclopentadienyl radicals having 6 to 13 carbon atoms, said process comprising reacting
  (A) a compound having the formula $M_1E_xM(CO)_6$,  where $M_1$ is selected from the class consisting of alkali and alkaline earth metal atoms, E is selected from the class consisting of bidentate and tridentate ethers, $x$ is an integer having the value of three when E is a bidentate ether and two when E is a tridentate ether, and M is a Group VB metal atom of atomic number of at least 41
  with
  (B) a compound having the formula $M_1Q_n$ wherein $n$ is the valance of $M_1$, and
  (C) an oxidizing agent selected from the Group IIB metal dihalides; said process being carried out at a temperature of about 25° to about 100° C.

2. Process for the formation of cyclopentadienyl tantalum tetracarbonyl, said process comprising reacting bis-(diethyleneglycol dimethylether) sodium hexacarbonyl tantalum (−1) with cyclopentadienyl sodium, and mercuric chloride.

3. The process of claim 1 wherein said metal dihalide is mercuric chloride.

4. The process of claim 1 wherein the metal $M_1$ is sodium.

5. The process of claim 3 wherein the metal $M_1$ is sodium.

6. The process of claim 5 being carried out in the presence of an inert ether as a reaction medium.

7. The process of claim 6 wherein said ether is dimethoxyethane.

8. The process of claim 2 being carried out in dimethoxyethane as a reaction medium.

9. Process for the preparation of cyclopentadienyl tantalum tetracarbonyl, said process comprising reacting tris-(dimethoxyethane) sodium hexacarbonyl tantalum (−1) with cyclopentadienyl sodium and mercuric chloride.

10. The process of claim 9 being carried out in the presence of dimethoxyethane as a liquid reaction medium.

References Cited by the Examiner
UNITED STATES PATENTS

| | | | |
|---|---|---|---|
| 2,960,514 | 11/58 | Brown | 260—429 |
| 2,916,400 | 12/59 | Homer et al. | 117—107 |
| 2,921,868 | 1/60 | Berger | 117—107 |
| 2,987,528 | 6/61 | Brown | 260—429 |
| 3,028,404 | 4/62 | Pearson et al. | 260—429 |

TOBIAS E. LEVOW, *Primary Examiner.*